United States Patent [19]

Derman

[11] 4,230,324
[45] Oct. 28, 1980

[54] DEVICE FOR SEALING AN ANNULAR OPENING BETWEEN A SHAFT AND HOUSING SURROUNDING THE SHAFT

[75] Inventor: Karl G. Derman, Partille, Sweden

[73] Assignee: K. G. Derman AB, Partille, Sweden

[21] Appl. No.: 972,337

[22] Filed: Dec. 22, 1978

[30] Foreign Application Priority Data

Dec. 23, 1977 [SE] Sweden .............................. 7714719

[51] Int. Cl.³ ............................................. F16J 15/46
[52] U.S. Cl. ....................................... 277/74; 277/75;
277/27; 277/168; 415/110
[58] Field of Search .................... 277/59, 71, 72 R, 79,
277/73–77, 133, 134, 27, 168, 170–172, 216,
217; 415/110–112, 115; 417/407

[56] References Cited

U.S. PATENT DOCUMENTS

| 2,686,657 | 8/1954 | Kalitinsky | 277/71 X |
| 2,865,300 | 12/1958 | Garris | 277/74 X |
| 3,512,788 | 5/1970 | Kilbane | 415/110 X |
| 3,804,424 | 4/1974 | Gardner | 277/74 X |

FOREIGN PATENT DOCUMENTS

| 436498 | 11/1926 | Fed. Rep. of Germany | 277/74 |
| 1242246 | 8/1971 | United Kingdom | 415/110 |

*Primary Examiner*—Robert S. Ward, Jr.
*Attorney, Agent, or Firm*—Eugene E. Renz, Jr.

[57] ABSTRACT

A device for sealing an annular space between a housing having a through opening and an inner part such as a shaft rotatably mounted in the housing. The device comprises a sealing element positioned in the annular opening and sealingly connected with either the shaft or the housing and having a sealing surface adapted to cooperate with an opposing sealing surface of the shaft. A pressure fluid is supplied to a clearance between the sealing surfaces at a pressure which is higher than the pressure in the space at each side of the sealing element. The sealing surfaces have the shape the rotational surfaces inclined in relation to the axis thereof; for example, conical surfaces, and are displaceable in relation to each other so that the width of the clearance space between the sealing surfaces is at least partially determined by axial movement of the sealing surfaces in relation to each other.

8 Claims, 8 Drawing Figures

DEVICE FOR SEALING AN ANNULAR OPENING BETWEEN A SHAFT AND HOUSING SURROUNDING THE SHAFT

BACKGROUND OF THE INVENTION

The present invention relates to a device for sealing an annular opening between an inner part, preferably a shaft, and an outer part surrounding said inner part, said parts being rotatable in relation to each other.

The sealing device according to the invention is especially suitable for complicated sealing applications, such as sealing arrangements for shafts and other movable elements operating in polluted atmosphere containing abrasive particles, or applications wherein a shaft extends through a wall and the difference between the pressures on opposite sides of the wall is substantial. Usually the sealing devices for such difficult sealing cases are complicated and expensive and have a short life.

A previously known sealing device for sealing an annular space between a shaft and a housing surrounding the shaft comprises a sealing element positioned in the annular opening and being constituted by a sleeve manufactured from an elastic material, usually rubber. The sleeve is sealingly connected with the housing, and to the interface between the sleeve and the shaft there is supplied a fluid, for example air or water, at a pressure which is higher than the pressures in the spaces at each side of the sleeve. Thereby there is provided a clearance space between the sleeve and the shaft, said space being filled with fluid which makes the friction between the sealing device and the shaft almost negligible, the fluid escaping into the spaces at each side of the sealing device thereby preventing connection between said spaces. In a sealing device of this kind the elasticity of an elastic material sleeve is takes advantage of, as the sleeve provides because of its elasticity a suitable clearance space between the sealing element and the shaft. However, it is a drawback that the rubber sleeve is easily damaged and does not stand high temperatures.

Thus, it is the object of the present invention to provide an improved sealing device of the kind described above.

SUMMARY OF THE INVENTION

In accordance with the invention there is provided a device for sealing an annular space between an inner part, preferably a shaft, and an outer part surrounding said inner part, said parts being rotatable in relation to each other, comprising a sealing element positioned in the annular space and sealingly connected with one of said parts and having a sealing surface adapted to cooperate with an opposing sealing surface adapted to cooperate with an opposing sealing surface on the other of said parts, and a device for supplying a pressure fluid to a clearance space between said sealing surfaces at a pressure which is higher than the pressures in the spaces at each side of the sealing element, wherein the sealing surfaces have the shape of rotational surfaces inclined in relation to the axis thereof, for example conical surfaces, and that the sealing surfaces are in such a way displaceable in relation to each other that the width of the clearance space between the sealing surfaces is at least partially determined by axial movement of the sealing surfaces in relation to each other.

In a sealing device according to the invention the sealing element can consist of a rigid ring, for example a metal ring, the sealing surface of which cooperates with an opposite sealing surface of for example a shaft and by means of axial displacement forms said clearance space between the sealing surfaces. A metal ring of this kind can be manufactured so that it is dividable. A dividable ring can easily be exchanged without requiring any dismounting of the surrounding structure. The ring also stands high temperatures and high velocity of the relative displacement between the sealing surfaces.

In a preferred embodiment of the invention the sealing element is spring loaded so that the sealing element strives to take a position wherein the sealing surfaces sealingly engage each other, when no pressure fluid is supplied to the sealing surfaces.

The invention is described in the following with reference to the accompanying drawings.

DESCRIPTION OF THE PREFFERED EMBODIMENTS

Figure 1:
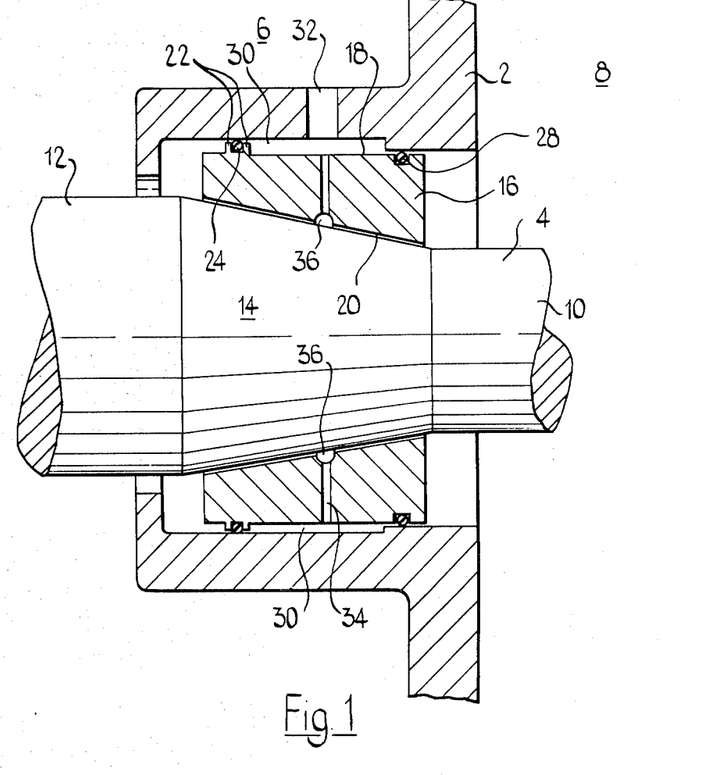
FIGS. 1, 2, 3, 4, 5, 6, 7 and 8 are axial sections showing eight different embodiments of sealing devices according to the invention.

In FIG. 1 reference numeral 2 relates to a portion of a housing forming a through opening for a shaft 4. The space inside the housing 2 is designated with reference numeral 6 while the space outside the housing 2 is designated with reference numeral 8. The shaft 4 has a portion 10 having a relatively small diameter and a portion 12 having a relatively great diameter, said portions being connected with each other by means of a conical portion 14 forming a sealing surface. In the annular space between the wall of the through opening of the housing 2 and the shaft 10 there is positioned a sealing element 16 having a substantially cylindrical outer surface 18 and a substantially conical inner surface 20. The cylindrical surface 18 is adapted sealingly to connect with the housing 2, while the conical surface 20 constitutes the sealing surface adapted to cooperate with the surface 14 of the shaft. The sealed connection between the surface 18 and the housing 2 is provided by the fact that the sealing element 16 is provided with peripheral projections 22 forming between themselves a groove for receiving an O-ring 24 and by the fact that the sealing element is formed with a groove for receiving an O-ring 28.

Between the through opening of the housing 2 and the surface 18 of the sealing element 16 and the O-rings 24 and 28 positioned in the grooves there is formed an annular chamber 30. The annular chamber 30 is connectable with a pressure fluid source through an opening 32 of the housing 2. The interface between the conical surface 20 of the sealing element and the conical surface 14 of the shaft is connected with the chamber 30 through several radially extending channels positioned at a distance from each other around the sealing element. The channels are at their inner ends connected with a peripheral groove 36 formed in the conical surface 20 of the sealing element 16. It is also possible to provide the sealing element 16 with axially extending distribution grooves (not shown), each groove preferably being positioned opposite to one of the channels 34.

When pressure fluid is supplied through the opening 32, the fluid distributes around the sealing element 16 in the chamber 30, and the fluid is supplied to each channel 34 in the sealing element 16. The pressure of the fluid exceeds the pressures of the spaces at the opposite sides of the sealing element, the sealing element thereby striving to be displaced axially to the right in the figure for creating a clearance space between the surface 14 and 20. Thereby the fluid escapes from the ends of the clearance space to the spaces 6 and 8, so that no connection can be established between the spaces 6 and 8 and said spaces are thereby efficiently separated from each other. The sealing element 16 constitutes a non-contacting sealing element which provides a clearance space between the sealing surfaces 14 and 20, the width of the clearance space being uniform and dependent from the pressure of the fluid supplied to the clearance space and the pressures in the spaces 6 and 8. As the axial projection of the sealing surface 20 is greater than the end surface of the chamber 30 constituted by the inner projection 22 and the sealing ring 24, the axial position of the sealing element will be balanced by the pressure against the surface 20 being decreased when the clearance space between the sealing surfaces is widened, while the pressure of the chamber 30 is substantially constant because of the throttling of the fluid flowing through the channels 34.

Figure 2:
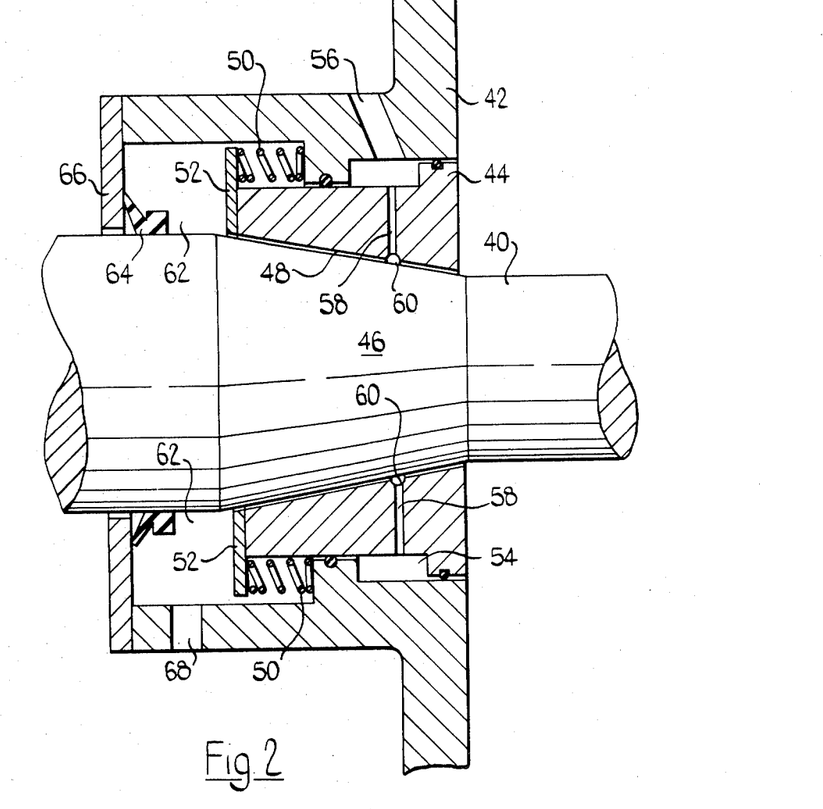

FIG. 2 is an axial section of a second embodiment of the invention. Also in this embodiment a shaft 40 extends through a through opening of a housing 42. In the annular opening between the wall of the through opening of the housing and the shaft 40 there is positioned a sealing element 44. The shaft 40 has a conical sealing surface 46 which cooperates with a corresponding conical surface 48 of the sealing element 44. The sealing element 44 is spring loaded by means of a number of conventional helical springs 50 which are positioned between a ring 54 connected with the sealing element and an opposite surface of the housing 42. The springs 50 strive to maintain the conical sealing surfaces 46 and 48 in engagement with each other. Thus, in this embodiment the sealing element is maintained in a predetermined position independently of the pressures in the spaces at opposite sides of the sealing element. An annular chamber 54 is provided between the housing and the sealing element, and this chamber is connected with a pressure fluid source through a channel 56 formed in the housing 42. The chamber 54 is connected with a number of radially extending channels 58 peripherally spaced from each other around the sealing element and connected with a peripheral groove 60 in the sealing element 44.

When pressure fluid is supplied to the chamber 54 through the channel 56 the sealing element 44 is axially displaced to the right according to the figure for forming a clearance space between the conical sealing surfaces 46 and 48, the pressure fluid escaping to the spaces at opposite sides of the sealing element. Thus, the sealing element according to FIG. 2 operates in the same way as the sealing element according to FIG. 1 for preventing connection between the spaces at the opposite sides of the sealing element and for creating a non-contacting, frictionless sealing. When the supplying of pressure fluid is terminated, the springs 50 return the sealing element to the position wherein the sealing surfaces engage each other.

In order to prevent the pressure fluid from escaping to the inner space of the housing from the space 62 to the left of the sealing device there is provided a sealing ring 64 on the shaft 40, said sealing ring cooperating with a washer 66 connected with the housing. The fluid escaping to the space 62 between the sealing element 44 and the sealing ring 64 is collected in this space and is discharged through a channel 68 from which the fluid can be returned to the pressure fluid source for being recirculated to the pressure fluid channel 56.

Figure 3:
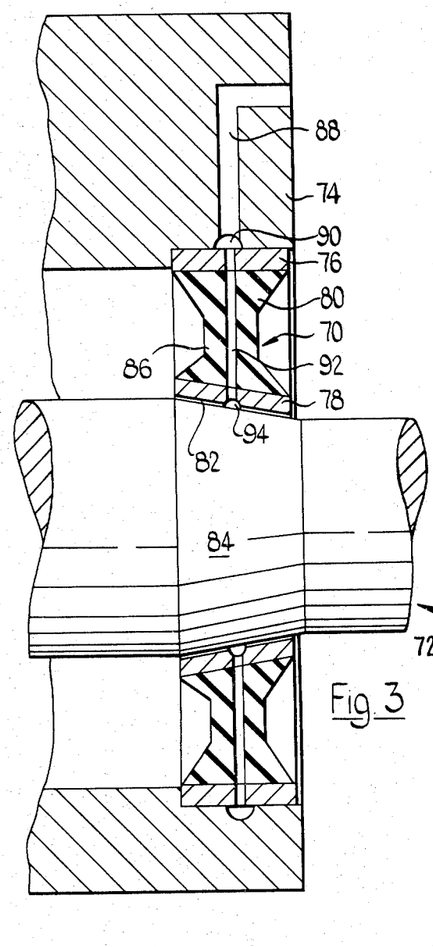

The embodiment of the sealing device according to the invention as shown in FIG. 3 comprises a sealing element 70 which is positioned in an annular opening between a shaft 72 and a housing 74 through which the shaft extends. The sealing element 70 comprises an outer ring 76 which is of substantially cylindrical shape and is tightly clamped in the housing 74, an inner ring 78 of a rigid material, for example bakelite, and a portion 80 of an elastic material positioned between the rings 76 and 78 and connecting said rings with each other, the portion 80 preferably consisting of soft rubber. The inner ring 78 has a conical sealing surface 82 cooperating with a conical sealing surface 84 of the shaft 72. The rubber portion 80 is formed with a relatively thin central part 86 which provides that the inner ring 78 is displaceable in the axial direction for forming a clearance space between the sealing surfaces 82 and 84, the ring 78 additionally being radially movable for adjusting to an eccentric movement of the shaft 72. As in the embodiments according to FIGS. 1 and 2 there is provided in the housing a supply channel 88 for pressure fluid, a distribution chamber 90 in the housing, radial channels 92 in the sealing element and a peripheral groove 94 in the conical surface 82 of the sealing element.

When pressure fluid is supplied to the device there is provided a clearance space between the conical surfaces 82 and 84, the fluid escaping from the end of the clearance space to the spaces at opposite sides of the sealing element for separating said spaces from each other. When the pressure fluid supply is terminated the surfaces 82 and 84 return to contacting position because of the elasticity of the rubber.

Figure 4:
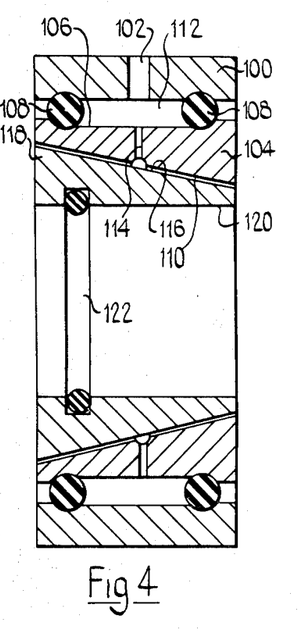

FIG. 4 is an axial section of a sealing unit adapted to be included in a conventional construction comprising a shaft and a housing or the like enclosing the shaft. The sealing unit comprises an outer sleeve 100 which is provided with a fluid supply channel 102 which is adapted to be connected with a pressure fluid source. The sleeve 100 is clamped into a housing or the like, the channel 102 being positioned opposite to an opening in the housing which opening is in turn connected with the pressure fluid source.

In the sleeve 100 there is provided a sealing element 104 having an outer shallow groove 106, in which sealing rings in the form of O-rings 108 are positioned for sealing the space between the sleeve 100 and the sealing element 104. The rings 108 allow at least a restricted axial displacement of the sleeve 100 and the sealing element 104 in relation to each other. The inner surface of the sealing element is formed by a conical sealing surface 110. Between the sleeve 100 and the sealing element 104 and between the sealing rings 108 there is provided a distribution chamber 112, said chamber extending around the sealing element 104 for distributing the fluid supply through the channel 102. The sealing element 104 is provided with a number of radially extending channels 114 positioned at peripheral distances from each other, said channels being adapted to supply fluid to the interface between the conical surface 110 and an opposite conical surface 116 of an inner sleeve 118. The sleeve 118 has a cylindrical inner surface 120, having a groove for receiving a sealing ring 122. The sleeve 118 can be positioned on a conventional continuous shaft for constituting the conical counterface which in the embodiments according to FIGS. 1, 2 and 3 is formed directly in the material of the shaft.

It is recognized that the sealing unit shown in FIG. 4 is operated in the same way as the sealing devices according to FIGS. 1, 2 and 3, i.e. the fluid which is supplied to the device through the channel 102, the distribution chamber 122 and the channels 114 provides an axial displacement of the sealing element 104 so that there is formed a clearance space between the conical surface, the pressure fluid escaping from both ends of the clearance space. Thus, the sealing unit according to FIG. 4 constitutes a device which can be included in substantially all constructions, wherein a shaft extends through a housing or the like.

Figure 5:
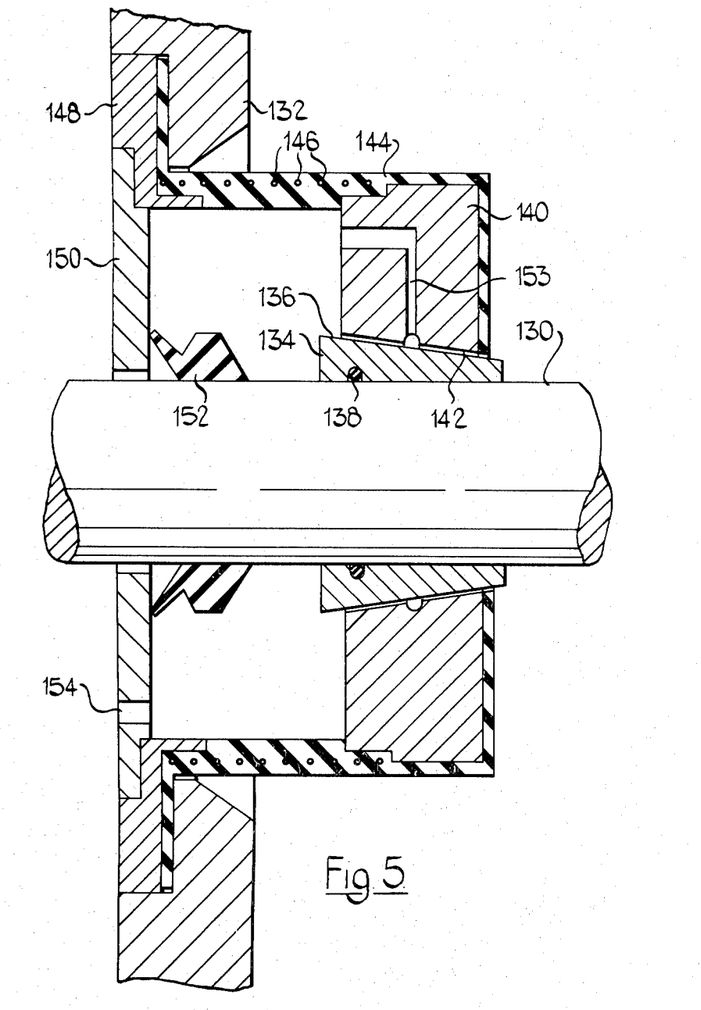

Also the embodiment of the invention shown in FIG. 5 is adapted for sealing an annular space between a shaft 130 and a housing 132 surrounding the shaft. On the shaft 130 there is provided an annular element 134 having an outer conical surface 136 and sealed in relation to the shaft by means of an O-ring 138 positioned in a groove in the shaft. Outside the ring 134 there is provided a sealing element 140 having a conical sealing surface 142 opposing the surface 136. The outer surface of the sealing element 140 is connected with the housing 132 by means of an elastic material sleeve 144. Preferably the sleeve consists of rubber and is provided with a spring reinforcement 146. Preferably the sleeve is vulcanized to the outer surface of the sealing element 140 at one side surface thereof as shown in the drawing and the sleeve is at its other end clamped between the housing 132 and a clamping ring 148 which by means of for example bolts (not shown) is connected with the housing 132. The space inside the sleeve 144 at one side of the sealing element 140 is closed by means of an end washer 150 and a sealing ring 152. The sealing element is provided with a number of radially extending channels 153 for supplying a pressure fluid to the space between the conical surfaces 136 and 142. When the pressure fluid is supplied there is provided a clearance space between the conical surfaces, the fluid escaping from both ends of the clearance space. The pressure fluid escaping from the left end of the clearance space is drained from the space sealed by means of the washer 150 and the sealing ring 152 through a channel 154. The embodiment according to FIG. 5 can be modified by extending the ring 134 forming the sealing surface 136 to the left and providing the ring with suitable shoulders and grooves for supporting and fixing the ring 152 and for supporting and fixing for example a ball bearing.

Figure 6:
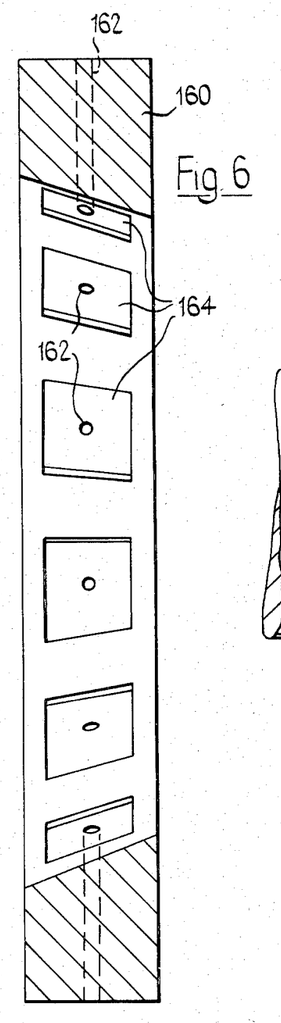
Figure 7:
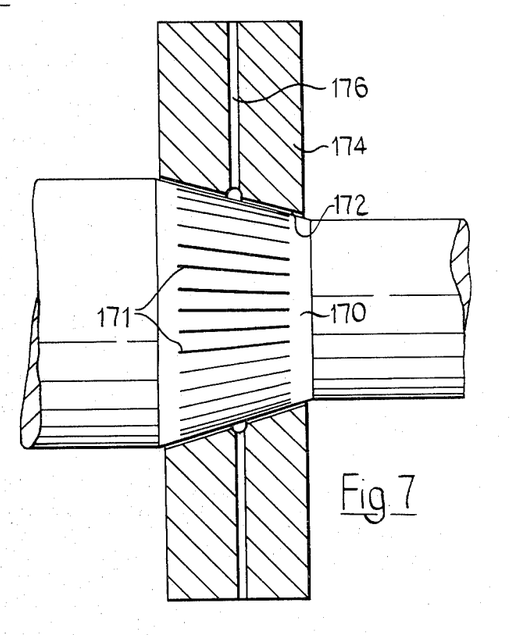

In FIG. 6 there is shown an embodiment of the invention, wherein the conical surface has a special design. As is the case in the embodiments of the invention described above the sealing element 160 is provided with a number of radially extending channels 162. In contrast to the design of the above described embodiments of the invention, wherein the channels open into a common, peripheral groove, each channel 162 opens into a separate pressure chamber 164. This design of the conical surface of the sealing element provides for an improved centering and an improved control of the width of the clearance space in relation to the opposite conical surface. In the embodiment according to FIG. 7 the conical surface 170 which cooperates with the conical surface 172 of the sealing element 174 is provided with a number of axially extending grooves for improving the action of the conical surface 172 as to the action of bringing with it the fluid applied to the clearance space between the surfaces 172 and 170 through the channels 176 in the sealing element 174.

Figure 8:
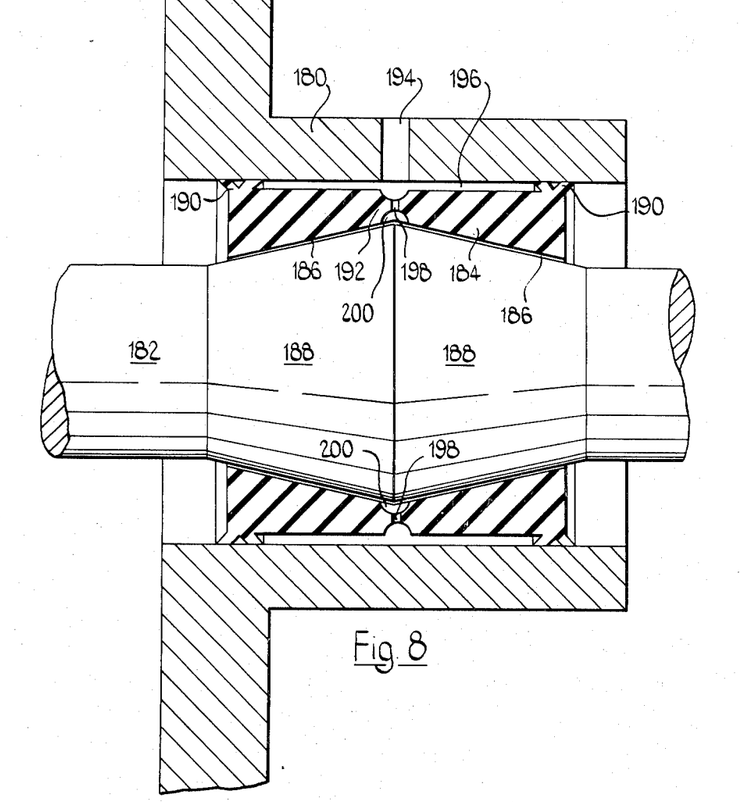

In the embodiment according to FIG. 8 a sealing element 184 which is positioned in an annular opening between a housing 180 and a shaft 182 comprises two symmetrically disposed portions each having a conical surface 186. The surfaces 186 cooperate with the conical surfaces 188 on the shaft 182. The sealing element 184 entirely consists of a rubber elastic material. Sealing lips 190 are formed at the outer surface of the sealing element for providing a sealed connection of the sealing element with the housing 180. The sealing element also comprises a central position 192 having reduced wall thickness facilitating the axial movement of the portions 184 at each side of the central portion 192 in the direction from each other for forming clearance spaces between the opposing pairs of sealing surfaces 186 and 188 when pressure fluid is supplied through a channel 194 in the housing 180, a distribution chamber 196, radial channels 198 in the sealing element 184 and a peripheral groove 200 in the sealing element. The sealing lips 190 allow that the sealing element as a whole follows the shaft 182 when the shaft is axially displaced, the sealing in relation to the housing 180 being thereby maintained. Of course, it is possible to manufacture the portions 184 at each side of the central portion 192 partly or entirely from a rigid material.

The invention can be modified within the scope of the following claims.

I claim:

1. The combination comprising a shaft extending through an opening in a housing mounted for rotation relative to one another, a unitary, annular sealing ring mounted in the annular space between the shaft and the housing in sealing relation with the housing, said unitary annular sealing element having a first conical surface confronting a second conical surface on the shaft which in a first position is in sealing engagement therewith, means for supplying a pressure fluid to the annular space between said confronting conical surface at a pressure higher than the pressure in the zones on opposite sides of said sealing ring thereby to displace said annular sealing ring in an axial direction to a second position whereby the pressurized fluid exits from the annular space between the conical surfaces and thereby effectively separates the lower pressure zones on opposite sides of said sealing ring.

2. The combination as claimed in claim 1, wherein the sealing element is spring loaded in such a way that the sealing surfaces sealingly engage each other when no pressure fluid is supplied to the clearance spece between the sealing surfaces.

3. The combination as claimed in claim 1, wherein the sealing surface opposite to the sealing surface of the sealing element is formed on a ring positioned on the shaft.

4. The combination as claimed in claim 1, wherein sealing means is provided between the outer surface of the sealing element and the outer part in such a way that the sealing element is axially displaceable in relation to the outer part while maintaining the sealing action between the sealing element and the outer part.

5. The combination as claimed in claim 1, wherein the sealing element consists of an entirely rigid ring, preferably consisting of metal.

6. The combination as claimed in claim 1, wherein the sealing element consists of an outer ring connected with the outer part and a rigid, inner ring which is provided with the sealing surface of the sealing element, the rings being connected with each other by means of an intermediate portion of a highly elastic material, preferably rubber.

7. The combination as claimed in claim 1, wherein at least one of said sealing surfaces is formed with chambers, which are connected with channels for the supplying of pressure fluid.

8. The combination as claimed in claim 1, wherein at least one of said sealing surfaces is provided with several axially extending grooves.

* * * * *